(12) United States Patent
Rivi

(10) Patent No.: US 7,736,500 B2
(45) Date of Patent: Jun. 15, 2010

(54) BYPASS VALVE WITH BLENDING FEATURE

(75) Inventor: Glenn Rivi, Mundelein, IL (US)

(73) Assignee: AWTP, LLC, Elk Grove Village, IL (US)

( * ) Notice: Subject to any disclaimer, the term of this patent is extended or adjusted under 35 U.S.C. 154(b) by 977 days.

(21) Appl. No.: 11/316,075

(22) Filed: Dec. 22, 2005

(65) Prior Publication Data

US 2007/0144953 A1    Jun. 28, 2007

(51) Int. Cl.
*F16K 11/12* (2006.01)
(52) U.S. Cl. .................. 210/190; 210/434; 137/599.12
(58) Field of Classification Search ................ 210/420, 210/434, 190–191; 137/637.5, 625.29, 599.12
See application file for complete search history.

(56) References Cited

U.S. PATENT DOCUMENTS

| | | | |
|---|---|---|---|
| 1,620,717 A | 3/1927 | Brice et al. | |
| 2,970,822 A * | 2/1961 | Ernest | ........................ 261/41.1 |
| 3,044,626 A | 7/1962 | Rose | |
| 3,080,974 A | 3/1963 | Rose | |
| 3,307,581 A | 3/1967 | Rudelick | |
| 3,547,151 A | 12/1970 | Kryzer et al. | |
| 3,797,523 A | 3/1974 | Brane et al. | |
| 4,187,872 A * | 2/1980 | Freeman et al. | .......... 137/454.6 |
| 4,466,457 A * | 8/1984 | Brane et al. | ............. 137/599.12 |
| 5,244,013 A | 9/1993 | Gagas | |
| 5,937,903 A | 8/1999 | Afshar et al. | |
| 6,347,644 B1 | 2/2002 | Channell | |
| 6,575,195 B2 | 6/2003 | Wichmann | |
| 6,908,545 B2 * | 6/2005 | Mouhebaty et al. | .......... 210/132 |

* cited by examiner

*Primary Examiner*—Terry K Cecil
(74) *Attorney, Agent, or Firm*—Vedder Price P.C.

(57) ABSTRACT

A bypass valve assembly for directing fluid flow having at least one inlet and at least one outlet for fluid flow, the bypass valve assembly being attachable to a fluid treatment system. The bypass valve assembly also includes at least one bypass valve in the bypass valve assembly, the bypass valve having a service configuration and a bypass configuration wherein in the service configuration at least a portion of fluid entering the bypass valve assembly through the inlet is transmitted to the water treatment system and wherein in the bypass configuration fluid entering the bypass valve assembly is not transmitted to the fluid treatment system. At least one blending valve is operatively interconnected to the bypass valve assembly, wherein when the bypass valve is in the service configuration the blending valve allows a portion of fluid entering the inlet to be transmitted to the outlet without being transmitted to the fluid treatment system.

6 Claims, 4 Drawing Sheets

BYPASS VALVE WITH BLENDING FEATURE

FIELD OF THE INVENTION

The present invention relates to a bypass valve for use with a water treatment system, and more particularly to a bypass valve with a blending feature.

BACKGROUND

Bypass valves for use with water treatment systems, such as water softeners and water filters are known in the art. Typically, such bypass valves contain inlet and outlet "service ports" and inlet and outlet "valve ports". The service ports generally face the source of untreated water and the valve ports face the water treatment system. Bypass valves generally have two configurations: a "service" configuration, where the bypass valve transfers untreated water from a household or commercial supply line to the treatment system and then transfers treated water exiting the treatment system to the household or commercial water system that ultimately leads to faucets, showers, and other end user plumbing attachments. The second configuration is generally referred to as a "bypass" configuration, wherein water flow to and from the treatment system is blocked and water entering the service inlet port passes through a bypass passage to eventually exit the service outlet port without coming into contact with the treatment system. The bypass configuration of a bypass valve is generally used when it is desired to use untreated water or when the treatment system needs to be maintained or repaired.

In addition to bypass functionality, it is sometime desired to have "blended" water (i.e., a mix of treated and untreated water) for end use. For instance, in the case of a water softening treatment system, it is sometimes desired to mix some amount of hard water with softened water, if, according to a user's preference, the treated water exiting the water softener is too soft. Most often this blending feature is built into the main control valve of the treatment system. Putting the blending feature on the control valve has some disadvantages: First, the manufacturer must produce and stock a larger variety of control valves, since not all customers wish to pay for the blending feature. Second, a valve is not easily converted from non-blending style to blending style in the field. Third, the blending adjustment itself may be relatively inaccessible to the end user, since the control valve may be hidden in an enclosure. Therefore, it is advantageous to include the blending feature in the bypass valve. Thus, while bypass valves having blending features have been known, there is a need for a bypass valve with a blending feature that is inexpensive, easy to use, and easily added in the field. Other needs will become apparent upon a further reading of the following detailed description taken in conjunction with the drawings.

SUMMARY

A bypass valve assembly for directing fluid flow having at least one inlet and at least one outlet for fluid flow, the bypass valve assembly being attachable to a fluid treatment system. At least one bypass valve is included in the bypass valve assembly, the bypass valve having a service configuration and a bypass configuration wherein in the service configuration at least a portion of fluid entering the bypass valve assembly through the inlet is transmitted to the water treatment system and wherein in the bypass configuration fluid entering the bypass valve assembly is not transmitted to the fluid treatment system. At least one blending valve is operatively interconnected to the bypass valve assembly, wherein when the bypass valve is in the service configuration the blending valve allows a portion of fluid entering the inlet to be transmitted to the outlet without being transmitted to the fluid treatment system.

BRIEF DESCRIPTION OF THE DRAWINGS

This invention will be more fully understood by reference to the following drawings, which are provided for illustrative purposes only.

DESCRIPTION OF THE PREFERRED EMBODIMENT

Figure 1:
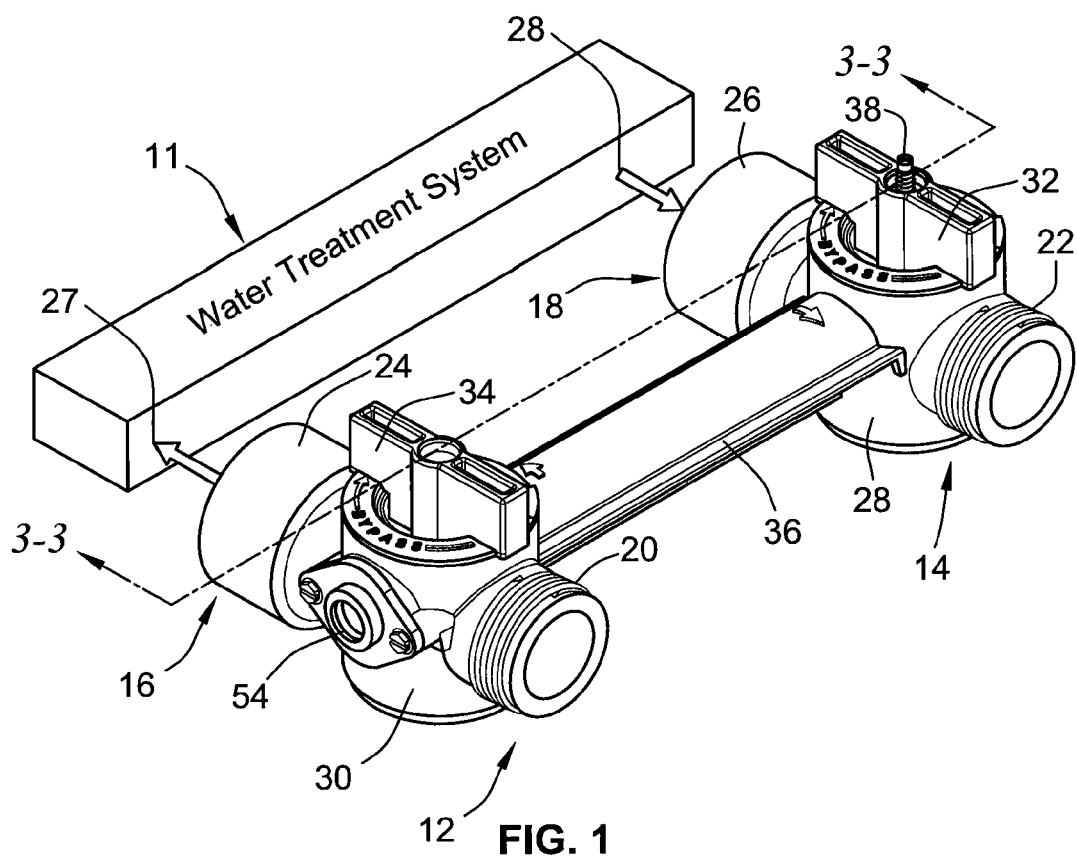
FIG. 1 shows a front perspective view of a bypass valve according to one embodiment with the bypass valve in a service mode.

While the present invention is capable of embodiment in various forms, there is shown in the drawings and described herein will hereinafter be described as a preferred embodiment with the understanding that the present disclosure is to be considered an exemplification of the invention, and is not intended to limit the invention to the specific embodiments illustrated.

With reference to FIG. 1, there is shown a bypass valve 10 assembly for use with a water treatment system 11, having a service port inlet 12, a service port outlet 14, a valve port inlet 16 and a valve port outlet 18. Preferably, service port inlet 12 contains external threads 20 for connection to a household or commercial supply line and service port 14 contains external threads 22 for connection to lines that connect, directly or indirectly, to faucets, showers, and other end user plumbing attachments. Valve ports 16 and 18 preferably contain collars 24 and 26, which contain internal threads and are used to connect to the inlet 27 and outlet 28 of the particular water treatment system 11 being used, which water treatment system 11 may be a water softener, water filter, iron removal system, etc. Although threads are shown and described with respect to connections to the service ports 12 and 14 and valve ports 16 and 18, it will be appreciated that any other type of permanent or non-permanent plumbing connection can be used in the practice of the present invention, such as cements, adhesives, solder, quick connect/disconnect fittings, etc.

The bypass valve assembly 10 also includes valve housings 28 and 30, which are preferably cylindrical in shape. Valve body 32 and valve body 34 sit within valve housings 28 and 30, respectively, and are rotatable with respect to the valve housings. Valve body 32 and valve body 34 contain o-rings 33, which act to prevent water from leaking past the walls of the valve housings 28 and 30.

Figure 3:
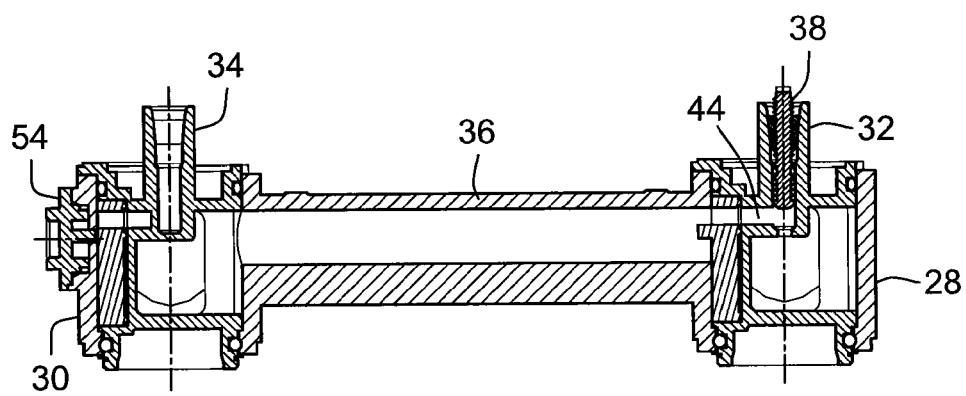
FIG. 3 is a cross-sectional view taken along 3-3 of FIG. 1 showing the bypass valve in a service mode.
Figure 2:
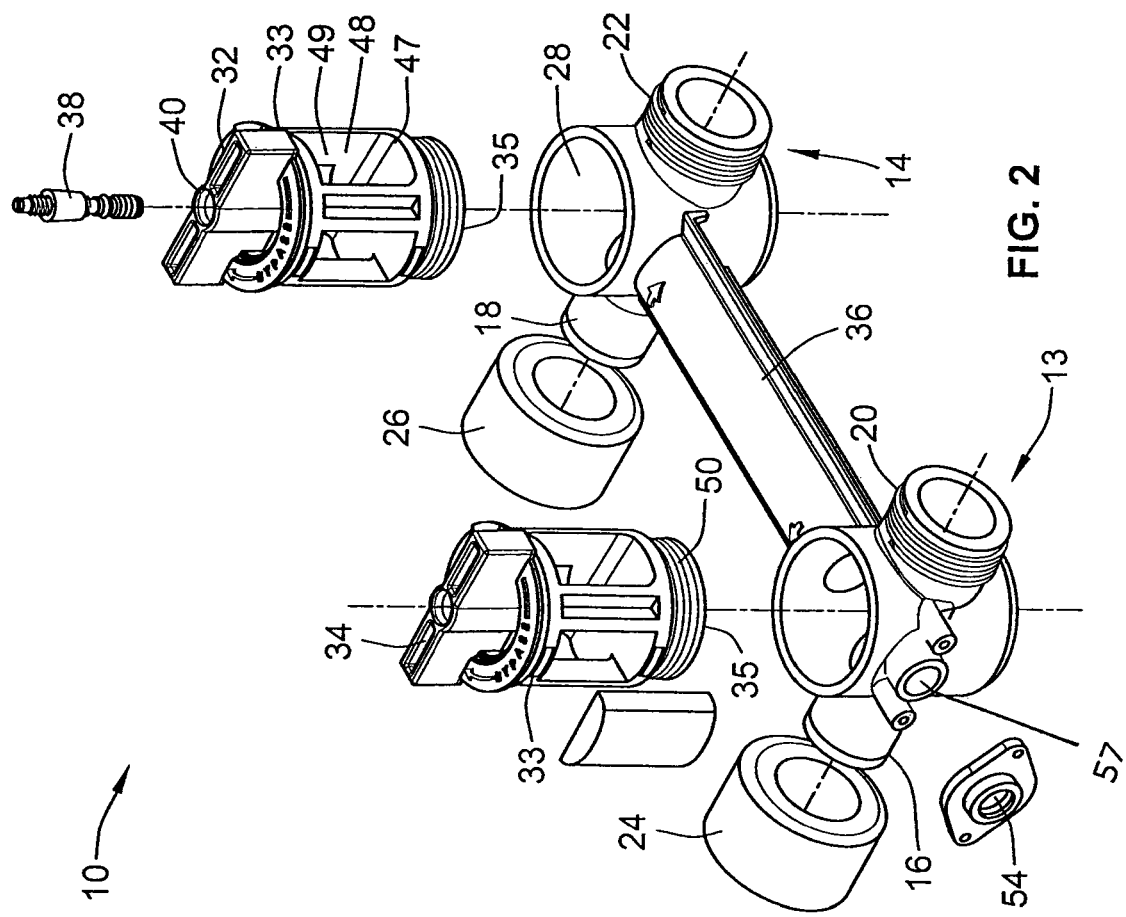
FIG. 2 shows an exploded view of the bypass valve of FIG. 1.
Figure 5:
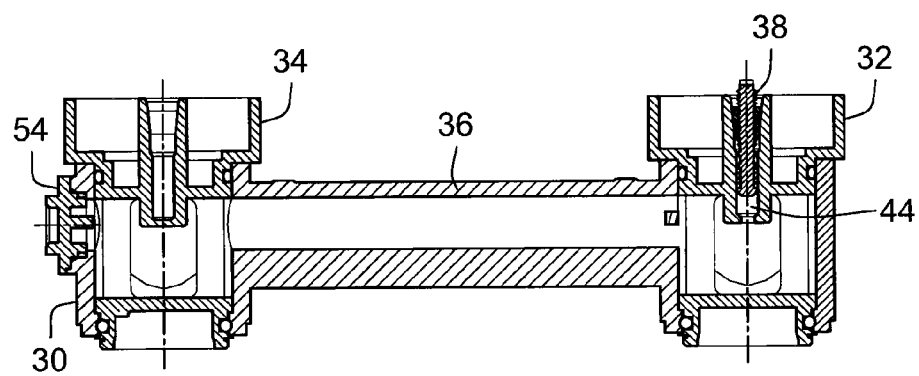
FIG. 5 is a cross-section view taken along section 5-5 of FIG. 4 showing the bypass valve of one embodiment in a bypass mode.

The bypass valve 10 also includes a bypass tube 36, which interconnects valve housings 28 and 30 and is in flow communication with the valve housings 28 and 30. A needle valve 38 threads into center section 40 of valve 32 and is preferably co-axial with the longitudinal axis 42 of valve 32. The needle valve 38 communicates with passageway 44 (FIGS. 3 and 5). Passageway 44 is in flow communication with the interior of valve housing 28 and port 46, as shown in FIGS. 2, 3 and 5. Port 46 is preferably formed in a valve insert 47, which preferably contains a gasket 49. Gasket 49 is preferably made of EPDM rubber and forms a seal between the valve insert 47 and the inner wall of the valve housing 28, thereby substantially preventing water from leaking out of port 46 and into valve inlet port 16 when the bypass valve is in bypass mode (described below). Port 46 is offset vertically from valve port outlet 18 so that gasket 49 may prevent water flow between them. In order to retain the valves 32 and 34 in the valve housings 28 and 30, a retaining clip (not shown) is placed within a peripheral groove 35 in the valves 32 and 34, after the valves 32 and 34 have been placed in the valve housings 28 and 30.

In a normal service mode, valves 32 and 34 are aligned as shown in FIGS. 1-3. In such a configuration, a portion of the water flowing through service port inlet 12 flows through valve housing 30 and into valve port 16, for transmission to the inlet of the water treatment system. In normal service mode, however, a portion of the water also flows through bypass tube 36, into port 46, through passageway 44 and then is blended with the treated water flowing from valve port outlet 18, through valve housing 28 and out of service port outlet 14. As can be appreciated from the drawings, the amount of blending will depend on the position of the needle valve within center section 40. For example, if more blending is desired, a user will turn needle valve 38 counter-clockwise, in a preferred embodiment, to allow more water to flow through passageway 44. Likewise, if less blending is desired, a user will turn needle valve 38 clockwise, in a preferred embodiment, to allow less water to flow through passageway 44. It should be noted that although a needle valve is used in one embodiment, the invention is not limited to having a blending feature using a needle valve and any other type of valve, such as, for example, a sliding spool, plug or ball valve, etc., can be used in the practice of the present invention. Moreover, the present invention is not limited to a valve that is co-axial with another valve and it will be appreciated that a blending valve of any type can be placed anywhere on or in the bypass valve to accomplish blending functionality.

Figure 4:
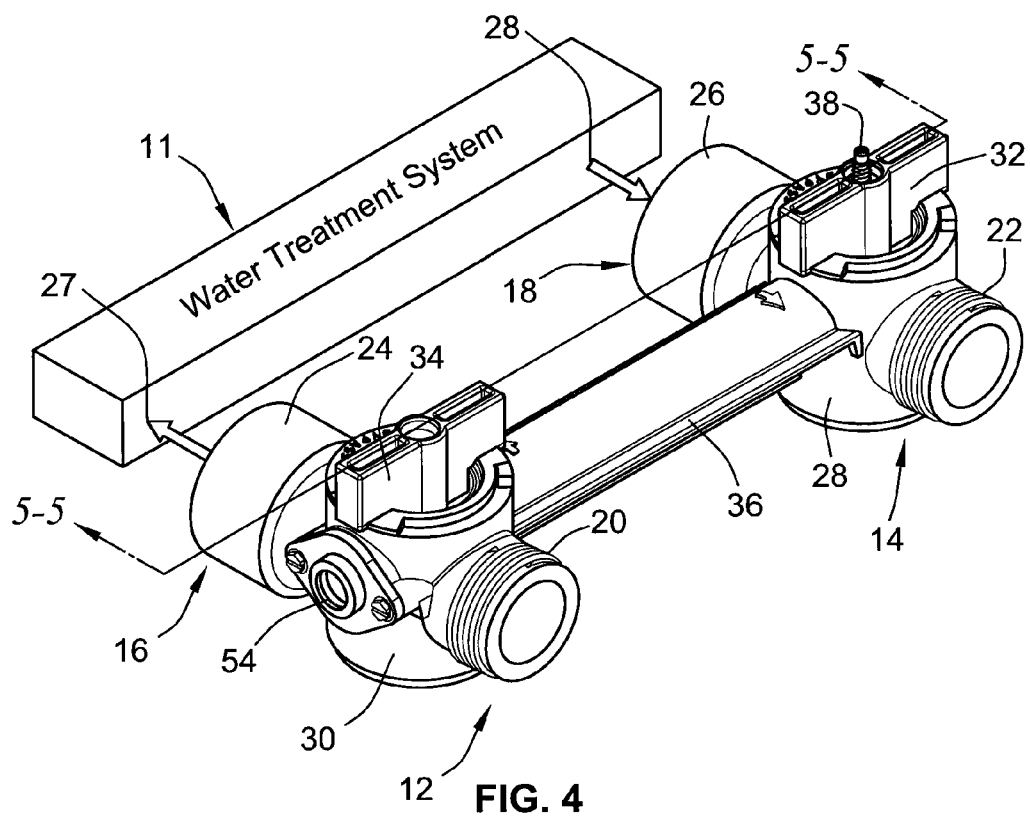
FIG. 4 shows a front perspective view of a bypass valve according to one embodiment with the bypass valve in a bypass mode.

In bypass mode, valves 32 and 34 are in the position shown in FIG. 4. In this position, water entering service port inlet 12 is blocked by wall 50 of valve 34 from entering valve port inlet 16. Instead, water entering service port inlet 12 is diverted by wall 50 into bypass tube 36 and, because wall 48 of valve 32 blocks the water from entering valve port outlet 18, the water flows out of service port outlet 14 and does not enter the water treatment system.

Figure 7:
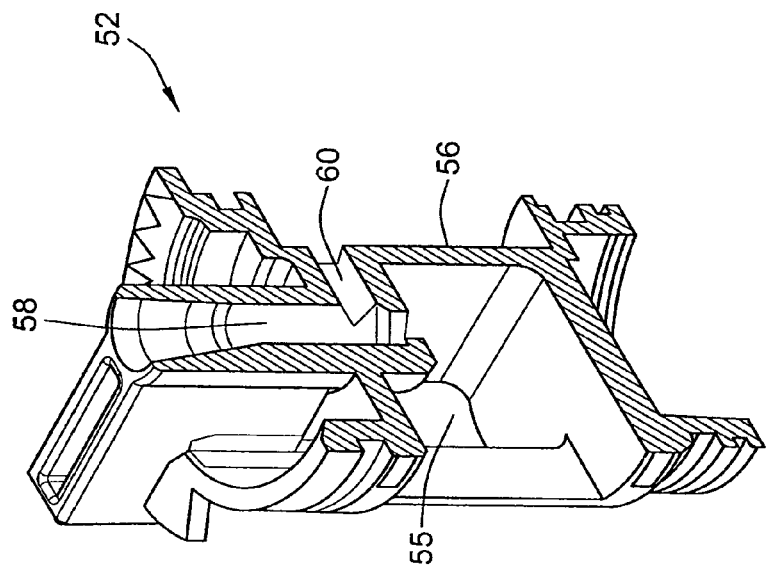
FIG. 7 is a cross sectional view taken along section 7-7 of FIG. 6.
Figure 6:
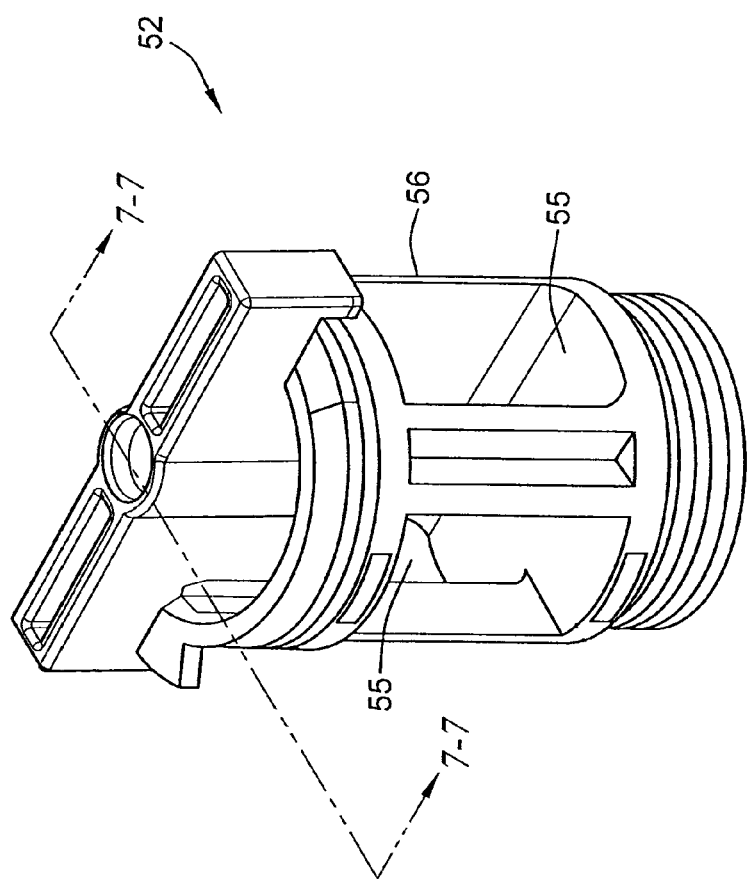
FIG. 6 is a front perspective view of a bypass valve body according to one embodiment.

FIGS. 6 and 7 show an exemplary valve body 52 for use with one embodiment. As can be seen, the valve body has openings 55 for fluid flow and a wall 56 for preventing fluid flow. Valve body 52 may optionally include an aperture 58 that is designed to accommodate a valve, such as a needle valve and a passageway 60 for fluid flow directed outside of the valve body 52.

Advantageously, other valves or pipes may be attached to the bypass valve 10 via port 57 which is preferably formed in valve house 30. If no such other valves or pipes are desired, an end cap 54 may be used to seal port 57. A further advantageous feature of one embodiment is that because the bypass valve bodies with and without a blending valve are of the same overall dimensions and shape, a bypass valve body with a blending valve incorporated therein may be replaced with a bypass valve body without a blending valve, or vice-versa. Such replacement may take place in the manufacturing facility, in the field, or after installation of the bypass valve assembly. It will be appreciated, however, that bypass valves having the same overall dimensions and shape is merely a preferred embodiment and that bypass valves having different dimensions and shapes can be used in the practice of the present invention.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A bypass valve assembly for use with a water treatment system having a water treatment inlet and a water treatment outlet, said bypass valve assembly comprising:
    a service port inlet, a first valve housing connected to said service port inlet and a valve port inlet connected to said first valve housing and said water treatment inlet;
    a first valve rotatably disposed in said first valve housing, said first valve having at least a first and second position;
    a bypass tube in fluid communication with said first valve housing;
    a service port outlet, a second valve housing connected to said service port outlet and a valve port outlet connected to said second valve housing and said fluid treatment outlet, wherein said second valve housing is in fluid communication with said bypass tube;
    a second valve rotatably disposed in said second valve housing, said second valve independently movable from said first valve and rotatable about a longitudinal axis between at least a first and second position, said second valve including a blending valve extending therein that is operatively interconnected to and co-axial with said second valve, said blending valve being in communication with a passageway extending from a point internal to said second valve to a point external to said second valve;
    wherein when said first and second valves are in said first position, water flowing into said service port inlet flows through said bypass tube and then out of said service port outlet; and
    wherein when said first and second valves are in said second position, water flowing into said service port inlet partially flows through said first valve housing and into said valve port inlet and partially flows through said bypass tube to said passageway in said second bypass valve to combine with a treated water flow.

2. The bypass valve assembly according to claim 1, wherein said blending valve is a needle valve.

3. A bypass valving assembly comprising:
    a water treatment system having a main control valve, water treatment inlet and water treatment outlet;
    a bypass valve assembly having at least one inlet and at least one outlet for water flow, said bypass valve assembly being attachable in fluid communication to said water treatment inlet and said water treatment outlet of said water treatment system;

a first bypass valve in said bypass valve assembly, said first bypass valve having a service configuration and a bypass configuration wherein in said service configuration at least a portion of water entering said bypass valve assembly through said inlet is transmitted to said water treatment system through said water treatment inlet and wherein in said bypass configuration water entering said bypass valve assembly through said inlet is not transmitted to said water treatment system through said water treatment inlet;

a second bypass valve positioned in said bypass valve assembly and independently moveable from said first bypass valve, said second bypass valve rotatable about a longitudinal axis between a service configuration and a bypass configuration wherein in said service configuration treated water exiting said water treatment system through said water treatment outlet passes through said second bypass valve and exits said bypass valve assembly through said outlet and wherein in said bypass configuration treated water does not pass through said second bypass valve;

a bypass tube in fluid communication between said first bypass valve and said second bypass valve; and a blending valve extending coaxially within and operatively connected to said second bypass valve and being variably adjustable between a fully open position and a fully closed position, wherein when the first bypass valve and said second bypass valve are in said service configuration, said blending valve permits untreated water to be transmitted through said bypass tube to said second bypass valve and mix with said treated water exiting the bypass valve assembly through said outlet.

4. The bypass valving assembly according to claim 3, wherein said water treatment system is a water softener.

5. The bypass valving assembly according to claim 3, wherein said water treatment system is a water filter.

6. The bypass valving assembly according to claim 3, wherein said water treatment system is an iron removal system.

* * * * *